(12) United States Patent
Piikivi

(10) Patent No.: US 7,395,049 B2
(45) Date of Patent: Jul. 1, 2008

(54) SECURITY ELEMENT COMMANDING METHOD AND MOBILE TERMINAL

(75) Inventor: Lauri Piikivi, Oulu (FI)

(73) Assignee: Nokia Corporation, Espoo (FI)

( * ) Notice: Subject to any disclaimer, the term of this patent is extended or adjusted under 35 U.S.C. 154(b) by 479 days.

(21) Appl. No.: 10/548,282

(22) PCT Filed: Mar. 2, 2004

(86) PCT No.: PCT/FI2004/000111

§ 371 (c)(1), (2), (4) Date: Sep. 1, 2005

(87) PCT Pub. No.: WO2004/080027

PCT Pub. Date: Sep. 16, 2004

(65) Prior Publication Data

US 2006/0173991 A1    Aug. 3, 2006

(30) Foreign Application Priority Data

Mar. 3, 2003    (EP) ............................... 03100516

(51) Int. Cl.
 *H04M 1/66* (2006.01)
(52) U.S. Cl. ................ 455/410; 455/411; 455/412.1; 455/418; 455/419; 709/224; 709/238
(58) Field of Classification Search .......... 455/410, 455/411, 412.1, 418, 419; 209/224, 238
See application file for complete search history.

(56) References Cited

U.S. PATENT DOCUMENTS 6,424,827 B1 * 7/2002 McGregor et al. .......... 455/411
6,836,655 B1 * 12/2004 Watler et al. ............... 455/411
2002/0123335 A1 9/2002 Luna et al.
2002/0186845 A1 * 12/2002 Dutta et al. ................ 380/247
2007/0233999 A1 * 10/2007 Jerding et al. ............. 711/171

FOREIGN PATENT DOCUMENTS

EP    1 107 627 A1    6/2001
EP    1 246 434 A1    10/2002

(Continued)

OTHER PUBLICATIONS

Java Community Process, "Security and Trust Services API (SATSA) for Java 2 Micro Edition", Version 1.0, Draft 0.4, 2003.

(Continued)

*Primary Examiner*—David Nguyen
(74) *Attorney, Agent, or Firm*—Hollingsworth & Funk, LLC

(57) ABSTRACT

The invention relates to a method for commanding a security element of a mobile terminal, and to a mobile terminal. An installed application of the mobile terminal issues a command to a platform library of the mobile terminal. Then the platform library reads information from an access control file of the security element. After this, the platform library obtains an access code for the security element from a user according to the access control file information, and inputs the obtained access code and the command to the security element. An action is performed according to the command in the security element, if the access code is approved by the security element.

20 Claims, 1 Drawing Sheet

FOREIGN PATENT DOCUMENTS

| | | |
|---|---|---|
| JP | 10124645 | 5/1998 |
| JP | 10303931 | 11/1998 |
| JP | 11325918 | 11/1999 |
| JP | 2001117769 | 4/2001 |
| WO | WO 02/073552 A1 | 9/2002 |
| WO | WO 02/075677 A1 | 9/2002 |
| WO | WO 02/093361 A1 | 11/2002 |

OTHER PUBLICATIONS

Kunimitsu Satoh, "Card Technology of Information Age, Evolving IC Card", Japan Printer, The Japanese Society of Printing science and Technology, vol. 83, No. 12, Dec. 15, 2000, pp. 11-19. (labeled Ref. 1, no translation).

Hajime Yoshida and Shinichi Hirata, "Trends and Problems of Smart Card Technology", IPSJ Magazine, Information Processing Society of Japan, vol. 43, No. 3, Mar. 15, 2002, pp. 296-303. (labeled Ref. 2, no translation).

Shuichi Ishida, "Approach to Practical Information Security", Monthly Bar Code, Japan Industrial Publishing Company, Ltd., vol. 15, No. 14, Dec. 2, 2002, pp. 64-69. (labeled Ref. 3, no translation).

\* cited by examiner

SECURITY ELEMENT COMMANDING METHOD AND MOBILE TERMINAL

FIELD

The invention relates to a method for commanding a security element of a mobile terminal, and to a mobile terminal.

BACKGROUND

With the opening of the software environment of the mobile terminal and with the 3G (Third Generation) specifications, it is becoming possible for third parties (including cellular operators and mobile terminal manufacturers) to make applications for mobile terminals that handle the security element, usually a smart card, in the terminal. An application that is installed in the mobile terminal by the user can be called an installed application. The applications that reside more permanently in the mobile terminal are usually installed into the mobile terminal by the manufacturer when the device is manufactured, and are called a platform library. Throughout this application, we use these two terms: the installed application and the platform library. Usually, the user installs the installed application in the mobile terminal after s/he has acquired the mobile terminal, whereas the manufacturer installs the platform library or part thereof in the mobile terminal before the sale of the mobile terminal to the end-customer.

The Java™ Community Process (JCP) expert group defines a Java™ programming environment for mobile terminals and security elements in a specification called JSR-177 (Java™ Specification Request 177). Because installed applications, such as Java™ midlets, can be loaded into a terminal from multiple sources, and the security environment for those applications differs from the security environment of the security element, there needs to be a mechanism with which the security element application can define the installed applications that can invoke commands on the security element application.

The installed application can be signed, and the mobile terminal will verify the signature and thus the origin of the installed application. The mobile terminal can have separate restrictions on applications coming from cellular operators, manufacturers and others. So the issuer of the application signs the midlet, the mobile terminal verifies the signature and if the signature is that of the cellular operator, the midlet gets the rights specified for that security domain (for example can make a phone call, can access the security element, but cannot write to the mobile terminal operating system area).

The mobile terminal security element, such as a SIM (Subscriber Identity Module) or USIM (UMTS SIM) card, a security element of the terminal itself or a security element in an accessory of the terminal, is needed for secure storage and processing of data. Digital signature creation, for example, requires a very secure element in which to do the operation, because a private key cannot be compromised, and thus the private key cannot leave the security element. Other usages for security elements are access authentication to networks, storing electronic cash values or tickets, or processing financial transactions. So there is a need for installed applications to access the security element for these advanced features.

The basic problem is that the application running in the security element cannot itself verify that the installed application accessing it has the appropriate rights and is a valid application. The cellular operators want to limit SIM access to applications coming from the operators themselves. An attacking application can fake a security code for access granting, and it is not possible to transfer the whole installed application to the security element for verification (indeed it might be so that a valid application is given for verification but the attacking application uses the element after access granting).

BRIEF DESCRIPTION

An object of the invention is to provide an improved method for commanding a security element of a mobile terminal.

According to an aspect of the invention, there is provided a method for commanding a security element of a mobile terminal, the method comprising: issuing a command to a platform library of the mobile terminal by an installed application of the mobile terminal; reading information from an access control file of the security element by the platform library; obtaining an access code for the security element from a user according to the access control file information by the platform library; inputting the obtained access code and the command to the security element by the platform library; and performing an action according to the command in the security element, if the access code is approved by the security element.

Another object of the invention is to provide an improved mobile terminal.

According to another aspect of the invention, there is provided a mobile terminal, comprising a platform library; an installed application; a user interface; and a security element; the installed application being configured to issue a command to the platform library; the platform library being configured to read information from an access control file of the security element, to obtain an access code for the security element from a user via the user interface according to the access control file information, and to input the obtained access code and the command to the security element; and the security element being configured to perform an action according to the command, if the security element approves the access code.

The invention provides several advantages. The mobile terminal does not need to know the properties of a particular security element, thus one mobile terminal can use a variety of different security elements as long as they include an access control file with the information used for the access code obtainment. The security of the mobile terminal is increased as the installed applications cannot directly handle the security element and the access code. The invention allows the security element to define its own security perimeter.

LIST OF DRAWINGS

In the following, the invention will be described in greater detail with reference to the preferred embodiments and the accompanying drawings, in which FIG. 1 is a simplified block diagram illustrating the structure of a mobile terminal;

DESCRIPTION OF EMBODIMENTS

Figure 1:
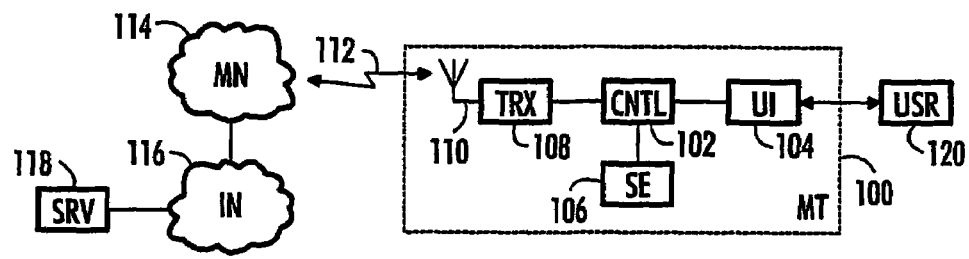

With reference to FIG. 1, an example of the structure of a mobile terminal 100 is described. The mobile terminal 100 can be a portable device relating to ubiquitous computing, for instance a subscriber terminal in a radio system, such as a mobile system, a PDA (Personal Digital Assistant) device, or another electronic device incorporating a security element 106 to its operation. The device may also combine various roles, i.e. it may for example be a combination of a subscriber terminal and a PDA device, the Nokia® Communicator® being one example of such devices.

In our example, the mobile terminal 100 is a subscriber terminal in a radio system, the mobile terminal 100 comprising an antenna 110 and a radio transceiver 108. The mobile terminal 100 is capable of establishing a two-way radio connection 112 with the network part 114 of the radio system. The radio transceiver 108 is for example a prior-art mobile station transceiver, which operates for example in the GSM (Global System for Mobile Communications) system, GPRS (General Packet Radio Service) system or UMTS (Universal Mobile Telecommunications System).

A typical mobile terminal 100 comprises as its user interface 104, which a user 120 of the mobile terminal 100 used for interaction with it, the following components: a keypad, display, microphone and loudspeaker. The power source of the mobile terminal 100 is generally a rechargeable battery.

The mobile terminal 100 comprises a control unit 102, which controls and monitors the operation of the terminal and the various parts thereof. Currently, the control unit 102 is generally implemented as a processor with software, but different hardware implementations are also possible, such as a circuit made of separate logic components, or one or more application-specific integrated circuits (ASIC). A combination of these different implementations is also possible. When selecting an implementation, a person skilled in the art considers, for example, the requirements set for the size and power consumption of the device, necessary processing performance, manufacturing costs and production volumes.

Figure 2:
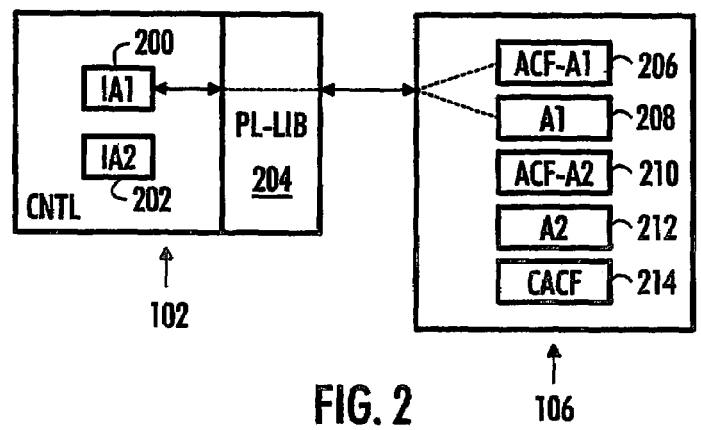
FIG. 2 illustrates the structures of a control unit and security element.

Next, with reference to FIG. 2, the structures of the control unit 102 and the security element 106 are illustrated. The control unit 102 comprises installed applications 200, 202 and a platform library 204. The security element 106 comprises security element applications 208, 212, and access control files 206, 210, 214.

The user 120 of the mobile terminal 100 can install one or more installed applications 200, 202 in the mobile terminal, after s/he has acquired the mobile terminal 100. The user 120 can, for example, download the installed application from a server 118 via the Internet 116 and the network part 114 of the radio system, as illustrated in FIG. 1. The server 118 can be a WWW-server (World-Wide Web), for example. The installed application 200, 202 is written in a programming language. One example of such a language is the Java™ programming language. JCP has developed the MIDP (Mobile Information Device Profile) architecture especially for mobile terminals. The programming environment is called J2ME™ (Java™ 2 Platform MicroEdition). In the MIDP architecture, the lowest level is the hardware of the mobile terminal 100. On top of the hardware is the native system software that comprises an operating system and a Java™ virtual machine. The operating system can be the Symbian™ operating system, for example. The manufacturer or operator installs the platform library 204 or part thereof in the mobile terminal 100 before the sale of the mobile terminal 100 to the end-customer. Thus in the MIDP architecture, the platform library 204 provides an interface, also known as API (Application Programming Interface), to the services provided by the native system software. In the MIDP architecture, the installed applications 200, 202 can be written in the Java™ programming language and they can be called midlets (cf. an applet in Java™).

The security element 106 is used for the secure storage and processing of data. The data in the security element 106 can be accessed and/or processed by issuing commands to the security element 106. Some commands can be such that they do not need an access code in order to be performed. Usually, due to the confidential nature of the data stored in the security element 106, the command must be accompanied with an access code provided by the user 120. The access code is usually a secret code or password. The access code is sometimes called a PIN (Personal Identification Number) code.

Commands to the security element 106 needing the access code are, for example: digital signature creation, access authentication to a network, storage of electronic cash values or a tickets, financial transaction processing. The installed application 200 is configured to issue a command to the platform library 204. The platform library 204 is configured to read information from an access control file 206 of the security element 106. Access control file information comprises access code usage instructions. Each application 208, 212 in the security element 106 has an access control file 206, 210 of its own, or an application in the security element 106 can also use a common access control file 214 of the security element 106. If the access control file 206 of the A1 application 208 of the security element 106 defines that an access code is needed in order to perform the command issued to the platform library, then the platform library 204 is configured to obtain the access code for the security element 106 from the user via the user interface 104 according to the access control file 206 information. Having received the access code, the platform library 204 is configured to input the obtained access code and the command to the security element 106. The input of the obtained access code and the command can be combined in one message or method call or another suitable mechanism to pass the information between the platform library 204 and the security element 106, or the input can be done separately by first giving one of the two and then giving the other.

The security element 106 is configured to perform an action according to the command, if the security element 106 approves the access code. In our example, this can be implemented so that the A1 application 208 receives the access code, checks that the access code matches the access code known by the application 208 or known by the security element 106, and performs the action according to the command, if the match is confirmed.

In an embodiment, the user interface 104 is configured to prompt the user for the access code with prompt information stored in the access control file 206. This embodiment enables the platform library 204 to handle the access code obtainment in a general way, without knowing the details. Another advantage is that the general appearance of the access code query always looks the same, so that the user 120 easily identifies that now confidential information is asked for.

In an embodiment, the user interface 104 is configured to display usage information on the access code usage stored in the access control file 206. This embodiment informs the user 120 why the access code is needed. If the displayed information is not consistent with the user's mental image of the usage, then s/he can identify a possibly malicious installed application that s/he can destroy from the memory of the mobile terminal 100.

In an embodiment, the user interface 104 is configured to display help information stored in the access control file 206. If the user 120 is uncertain, the help information can give confidence in the use of sensitive information and also aid in understanding which commands are possible at a certain stage.

In an embodiment, the platform library 204 is configured to download information complementary to the access control file 206 information from a server 118 identified by a network address stored in the access control file 206. Usually this server 118 is the same as where the installed application 200 was downloaded from, but naturally it can also be another server. The platform library 204 can be configured to validate the complementary information with a security certificate stored in the access control file 206. This is done for security reasons, so that the complementary information would not contain any harmful or malicious parts, such as viruses. The platform library 204 can also be configured to store the complementary information in the security element 106 and/or in the mobile terminal 100, so that if the same complementary information is needed in the future, it need not be downloaded again.

In an embodiment, the complementary information is in a different language than the information stored in the access control file 206. This embodiment makes it possible to adjust the needed memory capacity of the security element, as perhaps only some language versions are stored in the access control file 206, and other language versions are downloaded only as needed.

In an embodiment, the access control file information, i.e. prompt text information, usage text information and help text information, comprises a code, and the actual information item such as the text corresponding to the code is stored in the platform library 204 and/or in a server 118 identified by a network address stored in the access control file 206. This embodiment saves the memory of the security element 106, as different applications may use the same information item which is only stored once in the platform library 204.

Figure 3:
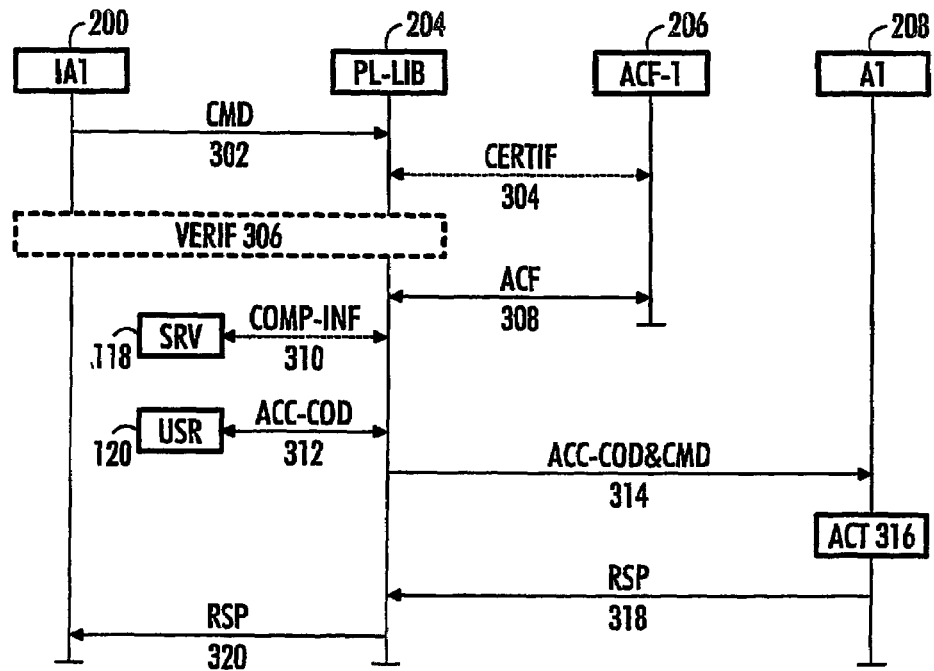
FIG. 3 is a signal sequence chart illustrating a method for commanding a security element of a mobile terminal.

With reference to FIG. 3, a method for commanding a security element of a mobile terminal is explained. The method starts by issuing 302 a command to a platform library 204 of the mobile terminal by an installed application 200 of the mobile terminal. According to the above-mentioned JSR-177, the platform library can support two types of connections: an APDU (Application Protocol Data Unit) connection and a Java™ Card RMI (Remote Method Invocation) connection. If APDU is used, then the installed application 200 can use a command that is as follows, for instance:

PerformSecurityElementCommand(command, command data) {
  Library internal operation for application access rights verification;
  Library internal operation for user prompting;
  Library internal operation for command parsing;
  Library internal operation for making command call to security element;
  Library internal operation for reading security element response;
  Library internal operation for giving response to installed application;
}.

RMI could offer to the installed application 200 a method, such as deduct_account(int amount), that would then be sent to the security element 106 with the described APDU command, for example.

These are, however, only examples of the command structure, and other kinds of commands can also be used, and besides a method call also a message interface can be used.

Next, in a optional operation, the platform library 204 checks 304 the access rights of the installed application to the security element by verifying if the installed application has the right to call the security element application 208. The platform library 204 reads the certificate for installed application verification from the access control file 206. The digital signature of the installed application 200 is verified 306 with the certificate. In our example, the verification succeeds and the installed application is thus authenticated.

Then the platform library 204 reads 308 information from an access control file 206 of the security element. In our example, the access control file information defines that an access code is needed in order to carry out the command 302. So for example PIN is used with command 0x02 (transaction authorization). The access control file information can also indicate how the access code is given in the command (for example, is it a parameter 1, parameter 2, or data part of the command, or is it a separate command 0x01 issued before command 0x02). The access control file information thus comprises access code usage instructions. As shown, the access control file 206 can be read two times by the platform library 204, in 304 and 308. An embodiment is also possible, wherein the access control file 206 is read only once, before the verification 306 and the access code obtainment 312.

In an embodiment, information complementary to the access control file information is downloaded 310 from a server 118 identified by a network address stored in the access control file. The complementary information can be validated with a security certificate stored in the access control file. The complementary information can be stored in the security element and/or in the mobile terminal. In an embodiment, the complementary information is in a different language than the access control file information. In an embodiment, the access control file information comprises a code, and the actual information item corresponding to the code is stored in the platform library and/or in a server identified by a network address stored in the access control file.

Next, the platform library 204 obtains 312 an access code for the security element from the user 120 according to the access control file information. Depending on the technology used, the access code can be realized according to the prior-art ways: a PIN code, password, acceptance indication (such as pressing an OK key for low security level items, such as a phonebook stored in the security element), or biometric authentication (such as fingerprint reading, protein scan, heat and/or pressure characteristics of finger or palm pressure, etc.).

In an embodiment, the access code is obtained by prompting the user for the access code with prompt information stored in the access control file. The prompt information can define that a prompt text "For network authentication" is displayed to the user. The obtaining 312 can also comprise displaying usage information on the access code usage and/or help information, stored in the access control file.

The platform library 204 inputs 314 the obtained access code and the command to the security element; in our example to the application 208 in the security element. The platform library 204 can include the access code into the data part of the command that is issued to the security element application 208, but two separate commands can also be used.

Then, in the security element, in our example in the application 208, an action is performed according to the command, if the access code is approved by the security element.

The security element, or application 208, returns a response 318 to the platform library 204. The response 318 can include feedback (or status) information and/or user information. Finally, the platform library 320 returns the response 320 to the installed application 200.

It is to be noted that the access code can be input to the security element already when the installed application starts in 302. In such a case, the user authentication can be in force until the installed application 200 is closed. The access code can also be such that it needs to be input again for each command. In both cases, the input access code may remain valid for a predetermined time period. The access code can be specific for each security element application, or several security element applications can share a common access code. The access code can also be command-specific.

The access control file 206 reading can also be performed when the installed application starts in 302. In such a case, the access control file 206 need not be accessed for individual commands issued to the security element 106, but the platform library 204 knows the access conditions and performs the user authentication 312 for the appropriate commands, for example.

It is possible that the access control file 206, or a reference to it, is returned after the security element application 208 is selected. In the security element 106, the application 208, 212 must be selected, as there can be many applications 208, 212. After the selection, the selected application 208 processes the commands given to the security element 106.

In some cases, the platform library 204 does not know that the access code is needed, and therefore issues a command to the security element 106 without it. Then, the security element application 208 can return an error message containing the access control file 206 or a reference to it, whereupon the platform library 204 can re-issue the command after it has examined the contents of the access control file 206 and the access code has been obtained according to the access control file 206 information.

Even though the invention is described above with reference to an example according to the accompanying drawings, it is clear that the invention is not restricted thereto but it can be modified in several ways within the scope of the appended claims.

The invention claimed is:

1. A method for commanding a security element of a mobile terminal, the method comprising:
    issuing a command to a platform library of the mobile terminal by an installed application of the mobile terminal;
    reading information from an access control file of the security element by the platform library;
    obtaining an access code for the security element from a user according to the access control file information by the platform library;
    inputting the obtained access code and the command to the security element by the platform library; and
    performing an action according to the command in the security element, if the access code is approved by the security element.

2. The method according to claim 1, wherein obtaining comprises prompting the user for the access code with prompt information stored in the access control file.

3. The method according to claim 1, wherein obtaining comprises displaying usage information on the access code usage stored in the access control file.

4. The method according to claim 1, wherein obtaining comprises displaying help information stored in the access control file.

5. The method according to claim 1, further comprising:
    downloading information complementary to the access control file information from a server identified by a network address stored in the access control file.

6. The method according to claim 5, further comprising:
    validating the complementary information with a security certificate stored in the access control file.

7. The method according to claim 5, further comprising:
    storing the complementary information in the security element and/or in the mobile terminal.

8. The method according to claim 5, wherein the complementary information is in a different language than the access control file information.

9. The method according to claim 1, wherein the access control file information comprises a code, and the actual information item corresponding to the code is stored in the platform library and/or in a server identified by a network address stored in the access control file.

10. The method according to claim 1, wherein the access control file information comprises access code usage instructions.

11. A mobile terminal, comprising
    a platform library;
    an installed application;
    a user interface; and
    a security element;
    wherein:
    the installed application is configured to issue a command to the platform library;
    the platform library is configured to read information from an access control file of the security element, to obtain an access code for the security element from a user via the user interface according to the access control file information, and to input the obtained access code and the command to the security element; and
    the security element is configured to perform an action according to the command, if the security element approves the access code.

12. The mobile terminal according to claim 11, wherein the user interface is configured to prompt the user for the access code with prompt information stored in the access control file.

13. The mobile terminal according to claim 11 wherein the user interface is configured to display usage information on the access code usage stored in the access control file.

14. The mobile terminal according to claim 11 wherein the user interface is configured to display help information stored in the access control file.

15. The mobile terminal according to claim 11 wherein the platform library is configured to download information complementary to the access control file information from a server identified by a network address stored in the access control file.

16. The mobile terminal according to claim 15, wherein the platform library is configured to validate the complementary information with a security certificate stored in the access control file.

17. The mobile terminal according to claim 15, wherein the platform library is configured to store the complementary information in the security element and/or in the mobile terminal.

18. The mobile terminal according to claim 15 wherein the complementary information is in a different language than the access control file information.

19. The mobile terminal according claim 11 wherein the access control file information comprises a code, and the actual information item corresponding to the code is stored in the platform library and/or in a server identified by a network address stored in the access control file.

20. The mobile terminal according to claim 11 wherein the access control file information comprises access code usage instructions.

* * * * *

UNITED STATES PATENT AND TRADEMARK OFFICE
CERTIFICATE OF CORRECTION

PATENT NO. : 7,395,049 B2  Page 1 of 1
APPLICATION NO. : 10/548282
DATED : July 1, 2008
INVENTOR(S) : Lauri Piikivi It is certified that error appears in the above-identified patent and that said Letters Patent is hereby corrected as shown below:

In the Claims

Column 8, Claim 13, line 35: "11 wherein" should be --11, wherein--.

Column 8, Claim 14, line 38: "11 wherein" should be --11, wherein--.

Column 8, Claim 15, line 41: "11 wherein" should be --11, wherein--.

Column 8, Claim 18, line 54: "15 wherein" should be --15, wherein--.

Column 8, Claim 19, line 57: "according claim 11 wherein" should be --according to claim 11, wherein--.

Column 8, Claim 20, line 62: "11 wherein" should be --11, wherein--.

Signed and Sealed this

Sixteenth Day of September, 2008

JON W. DUDAS
*Director of the United States Patent and Trademark Office*